United States Patent [19]

Takaoka et al.

[11] 4,385,376

[45] May 24, 1983

[54] METHOD OF MAKING AN OPTICAL MEMORY DISK AND A PRODUCT THEREBY

[75] Inventors: Takashi Takaoka; Masahiko Mochizuki; Tadao Miura, all of Yokohama; Mitsuo Yamashita, Tokyo, all of Japan

[73] Assignee: Tokyo Shibaura Denki Kabushiki Kaisha, Kawasaki, Japan

[21] Appl. No.: 299,483

[22] Filed: Sep. 4, 1981

Related U.S. Application Data

[62] Division of Ser. No. 133,924, Mar. 25, 1980.

[30] Foreign Application Priority Data

Jun. 20, 1979 [JP] Japan ................................. 54-77946

[51] Int. Cl.³ ............................................... G11B 7/24
[52] U.S. Cl. .................... 369/284; 369/275; 369/283; 369/286; 369/288; 346/135.1; 428/64; 428/65; 428/469; 428/913; 430/945; 430/961; 350/DIG. 1
[58] Field of Search ...................... 427/380, 343, 54.1, 427/164, 165, 166, 250, 383.1, 383.3, 258, 287, 261; 428/469, 64, 65, 913; 346/76 L, 135.1; 364/275, 283, 284, 286, 288; 264/1.4; 430/945, 961, 523; 350/DIG. 1

[56] References Cited

U.S. PATENT DOCUMENTS

| | | | |
|---|---|---|---|
| 3,445,281 | 5/1969 | Sullivan | 428/469 |
| 3,900,601 | 8/1975 | Franz et al. | 427/165 |
| 3,938,242 | 2/1976 | Sussman | 427/166 |
| 3,944,440 | 3/1976 | Franz | 427/165 |
| 3,971,874 | 7/1976 | Ohta | 428/422 |
| 4,000,346 | 12/1976 | Dowell | 427/165 |
| 4,214,249 | 7/1980 | Kasai et al. | 346/76 L |
| 4,222,071 | 9/1980 | Bell et al. | 346/76 L |
| 4,282,295 | 8/1981 | Lee et al. | 430/2 |
| 4,318,112 | 3/1982 | Kivits et al. | 346/76 L |

FOREIGN PATENT DOCUMENTS

| | | |
|---|---|---|
| 40-8590 | 5/1965 | Japan . |
| 52-32931 | 8/1977 | Japan . |
| 53-33242 | 9/1978 | Japan . |
| 1439869 | 6/1976 | United Kingdom ................ 427/132 |

OTHER PUBLICATIONS

Kensey et al., "An Optical Disk Replaces 25 Mag. Tapes", IEEE Spectrum, 2/1979, pp. 33-38.
Bertolim et al., "Optical Disk Systems Emerge", IEEE Spectrum, 8/1978, pp. 20-28.
Greenholt, IBM Technical Disclosure Bulletin, vol. 14, No. 8, Jan. 1972, p. 2358.

*Primary Examiner*—Stanley S. Silverman
*Attorney, Agent, or Firm*—Cushman, Darby & Cushman

[57] ABSTRACT

A method of making an optical memory disk and a product thereby comprising the steps of applying a thin tellurium film to a base plate, and of forming an oxidizing layer on the surface of the tellurium by oxidizing treatment of the tellurium film, and an optical memory disk produced by the above-mentioned method.

4 Claims, 10 Drawing Figures

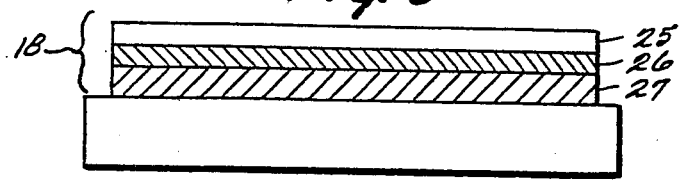
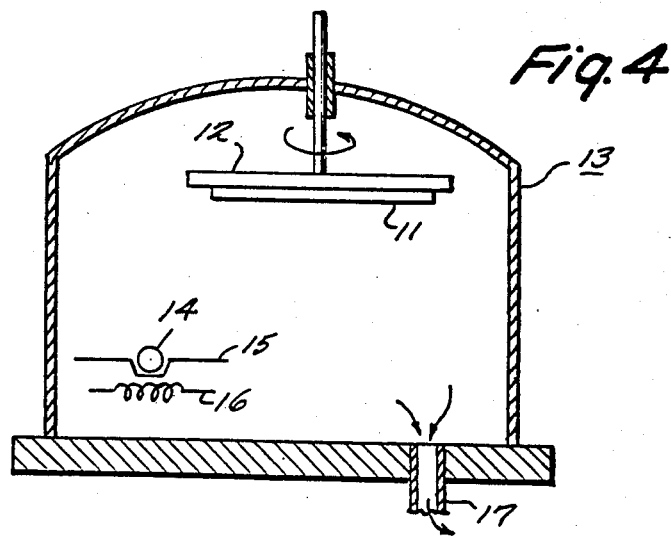
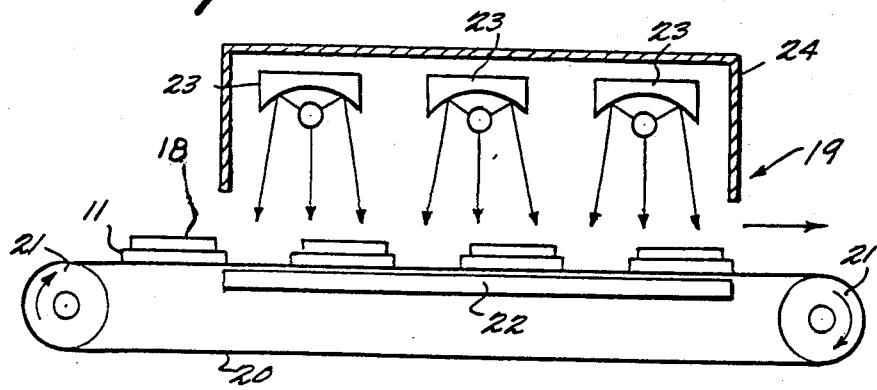

METHOD OF MAKING AN OPTICAL MEMORY DISK AND A PRODUCT THEREBY

This is a division, of application Ser. No. 133,924 filed Mar. 25, 1980.

This invention relates to a method of making an optical memory disk and a product thereby using tellurium and oxides thereof.

The possibility of recording information by laser at high density onto an optical memory disk has been observed by several workers in recent years. Typically, such disks are produced by applying an optical thin film of metal or pigment or the like onto a base plate. For example, the following publications describe such disks:
1. Seiji Yonezawa et al, "An Optical High Density Disk Using As-Te System Amorphous Film", which is a manuscript of a lecture given at the 26th Applied Physics Society of Japan on Mar. 27, 1979;
2. G. C. Kenney et al, "An Optical Disk Replaces 25 Mag Tapes", *IEEE Spectrum*, February 1979, page 33;
3. R. A. Bartolini et al, "Optical Disk Systems Emerge", *IEEE Spectrum*, August 1978, page 20.

The optical memory disk which is described in the above-mentioned documents is constructed as shown in FIGS. 1 or 2. In FIG. 1 a metallic film of tellurium 2 is formed on a base plate 1 as an optical recording film which has high sensitivity and high density for recording information. However, such a device is scarcely practical to use because the film of tellurium 2 is easily scratched by dust or a finger. A multi-layer structure disk, as shown in FIG. 2 resolves this problem by sandwiching the film between layers 3 and 4 of a heat insulating film, for example, $SiO_2$, and covering layer 4 by a layer of silicon resin 5. However, this structure has the problem of deterioration which is caused by chemical instability as the film is non-uniformly oxidized. This oxidation takes place even though the film is covered by layers. FIG. 3 shows the change in transmission factor (T) and reflection factor (R) with time. Recording sensitivity and signal/noise ratio decline during long term use. Thus, this prior art structure has serious practical drawbacks. Further, a multi-film structure as in FIG. 2 is very difficult to make easily and inexpensively.

It is an object of this invention to provide a method of making an optical memory disk with tellurium and oxides thereof.

It is another object of the invention to provide an optical memory disk which has mechanical and chemical stability and is able to maintain a high recording density and reproduction using tellurium.

This invention relates to a method of making an optical memory disk. A thin tellurium film is applied onto a base plate by any suitable technique. Preferably, at least two oxide layers are formed on the surface of the tellurium film by oxidation treatment of the surface of the tellurium.

This invention also relates to an optical memory disk. A thin film of tellurium is applied to a base plate. On the surface of the tellurium layer at least two oxide layers are formed by an oxidizing treatment of the surface of the tellurium film.

The foregoing objects and other objects as well as the characteristic features of the invention will become more apparent and more readily understood by the following description and the appended claims when read in conjunction with the accompanying drawings.

FIG. 4 is a fragmentary sectional view of a vacuum evaporator showing a vaporization process of a tellurium film;

FIG. 5 is a fragmentary sectional view of an oxidizing apparatus of an oxidizing treatment;

FIG. 6 is a sectional view of an optical memory according to the first embodiment of this invention;

Figure 1:
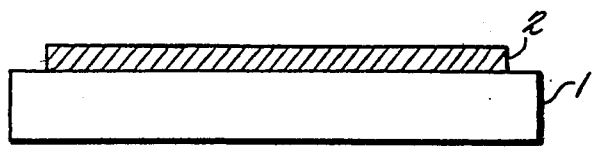
FIG. 1 and FIG. 2 are sectional views of an optical memory of the prior art.
Figure 2:
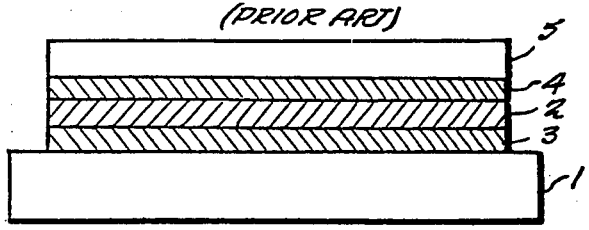
Figure 3:
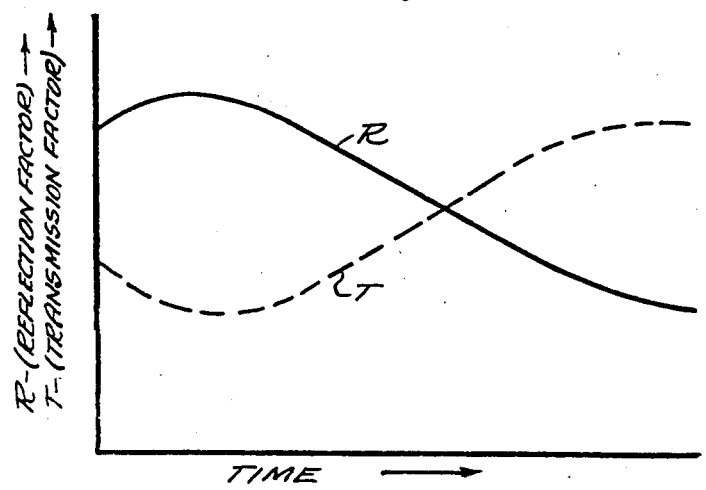
FIG. 3 shows deterioration of the optical memory of the prior art.

Now there will be described a first embodiment of this invention according to FIGS. 4, 5, and 6.

A base plate 11 is made of glass or plastic and is surface polished after being formed into a predetermined shape, for example, a disk. Base plate 11 is then fixed on a turntable 12 which is located in a vacuum chamber 13 shown in FIG. 4. A block of tellurium 14 is placed on crucible 15 for evaporation. Crucible 15 is located at a lower portion of the vacuum chamber 13 and a heater 16 is located to vaporize a quantity of tellurium 14. The air in vacuum chamber 13 is exhausted from exhaust pipe 17 by a vacuum exhausting pump (not shown). Base plate 11 rotates with turntable 12, and heater 16 is energized. Tellurium vapor evaporates from tellurium 14, and a tellurium film 18 is formed on base plate 11 about 300 Å in thickness.

Next, base plate 11 is introduced into an oxidizing apparatus 19 shown in FIG. 5 which is made of a conveyor 20, drive pulleys 21 for driving conveyor 20, heater 22 which is located beneath conveyor 20, ultra-violet irradiators 23 and cover 24. Base plate 11 and tellurium film 18 are heated to at least about 50° C. and preferably about 100° C. by heater 22 and are irradiated with 50 mW/cm$^2$ ultra-violet rays by irradiator 23 for about 30 minutes under low humidity. Tellurium film 18 is oxidized on its surface by this treatment and the oxidation is promoted by the heat. Typically, several layers of oxides will form, each layer being a different oxide. The number of layers and their composition can be controlled according to well known principles.

Figure 7:
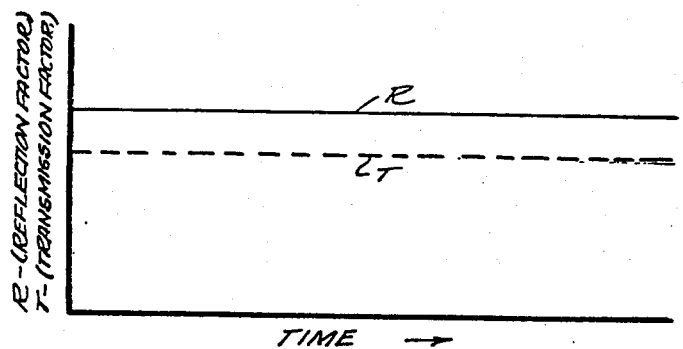
FIG. 7 shows deterioration of the present invention.
Figure 8:
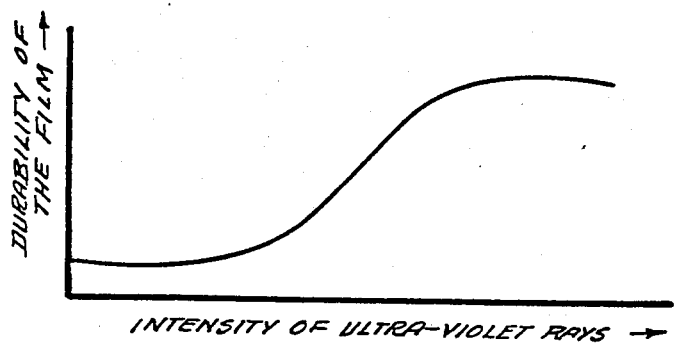
FIG. 8 is a diagram of the relationship between film hardness and ultra-violet ray intensity.

The optical memory produced by the above-mentioned process is shown in FIG. 6. Tellurium film 18 has a thickness of about 300 Å. A tellurium oxide ($TeO_2$) layer 25 of about 50 Å in thickness and a tellurium sub-oxide ($TeO_x : x < 2$) layer 26 of about 10 Å in thickness are formed on tellurium 27. Tellurium oxide layer 25 protects tellurium layer 27 like rust purposely formed on iron so that the transmission factor (T) and a reflection factor (R) do not change substantially with the passage of time (see FIG. 7). Further oxidized layer 25 is very strong against the mechanical impact, and protects tellurium film 18 against, for example, scratching, particularly if the thickness of layers 25 and 26 are increased by increasing the intensity of the ultra-violet rays. The recorded information will not change for a long time and the optical recording characteristic can be maintained for a long time. Heating by heater 22 during irradiation of the ultra-violet rays promotes the oxidation of the tellurium.

Oxidizing can be attained in an oxidizing atmosphere including irradiation of the ultra-violet rays. Oxidizing treatment can be attained by locating ultra-violet irradiator 23 in vacuum chamber 13. In this case, the steps of making an optical memory disk include forming a tellurium film onto a base plate by vacuum evaporation, and oxidizing a thin surface of the tellurium film to tellurium oxide by ultra-violet rays after changing the atmosphere in the vacuum chamber into a slightly oxidizing atmosphere.

Figure 9:
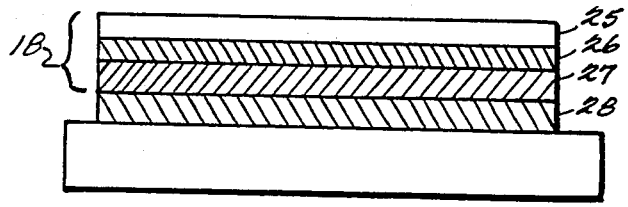
FIG. 9 and FIG. 10 show sectional views of an optical memory according to the second and third embodiments of this invention.

FIG. 9 shown an optical memory disk which is produced by a second embodiment of this invention. In this embodiment, a metal oxide film 28 which adheres to base plate 11 is formed onto base plate 11, and then tellurium film 18 is formed onto the metal oxide film 28. In the foregoing second embodiment, when tellurium film 18 is oxidized, mechanical intensity of tellurium film 18 is increased because adhesion of tellurium film 18 to base plate 11 is remarkably increased. The metal oxide film 28 is selected from SiOx, SnOx, InOx or TiOx($x \leq 2$).

Figure 10:
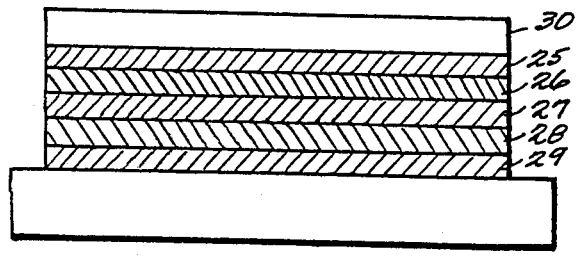

FIG. 10 shows an optical memory disk which is produced by a third embodiment of this invention. In this embodiment an aluminum film 29 is formed onto base plate 11, and then metal oxide film 28 and tellurium film 18 is formed thereon. A dust isolating film 30 is placed on the surface of tellurium film 18. In the foregoing third embodiment, dust isolating film 30 prevents dust from sticking to the surface of tellurium film 18.

Recently an optical memory disk has been made which has an airtight structure, that is airtight with ring spacers at inner and outer radii. Two facing base plates have a tellurium film on the opposing surfaces thereof.

In this memory disk, the airtight construction protects the tellurium film from dust and protects the tellurium chemically, but has the drawback of being airtight which is difficult to make. In this invention, it is very easy to make an optical memory disk having a structure protected against dust by using two disks of this invention without making airtight structure because tellurium film for an optical memory is protected chemically by an oxidized layer of tellurium.

Other modifications can be made without departing from the scope of this invention. For example, a sulfide film of metal, for example, zinc sulfate can replace metal oxide film. Under high humidity irradiation of ultra-violet rays by irradiator 23 need take place only about ten minutes. Accordingly, the scope of protection is intended to be limited only by the scope of the appended claims.

What is claimed is:

1. An optical memory disk having a thin film of tellurium formed on a base plate and at least two layers of an oxide of tellurium formed on the surface thereof, said layers being formed by an oxidizing treatment of said surface and being of different oxides.

2. A disk as in claim 1, wherein said oxide layers are formed by ultra-violet rays.

3. A disk as in claim 1 or 2 wherein said base plate is coated by a metal oxide film.

4. A disk as in claim 1 or 2, wherein said two layers are at least 20 Å thick and said tellurium layer is at least 200 Å thick.

* * * * *